United States Patent [19]
Jean et al.

[11] Patent Number: 4,847,623
[45] Date of Patent: * Jul. 11, 1989

[54] RADAR TANK GAUGE

[75] Inventors: Buford R. Jean; Richard W. Newton, both of College Station; Andrew J. Blanchard, Arlington; Billy V. Clark, College Station; Gary L. Warren, Bryan, all of Tex.

[73] Assignee: Idea, Inc., College Station, Tex.

[*] Notice: The portion of the term of this patent subsequent to Apr. 12, 2005 has been disclaimed.

[21] Appl. No.: 123,174

[22] Filed: Jan. 20, 1988

Related U.S. Application Data

[63] Continuation of Ser. No. 831,369, Feb. 19, 1986.

[51] Int. Cl.⁴ .................................................. G01S 13/08
[52] U.S. Cl. ...................................... 342/124; 342/172; 342/192
[58] Field of Search ................ 342/118, 120, 123, 124, 342/128, 165, 172, 192, 193, 195, 196, 197

[56] References Cited

U.S. PATENT DOCUMENTS

| | | | |
|---|---|---|---|
| 3,888,588 | 6/1975 | Granqvist | 356/5 |
| 4,044,353 | 8/1977 | Levy | 342/124 |
| 4,044,355 | 8/1977 | Edvardsson | 342/124 |
| 4,106,020 | 8/1978 | Johnson | 342/128 |
| 4,245,221 | 1/1981 | Kipp et al. | 342/128 |
| 4,360,812 | 11/1982 | Peperone | 342/128 |
| 4,621,264 | 11/1986 | Yashiro et al. | 342/124 |
| 4,737,791 | 4/1988 | Jean et al. | 342/124 |

FOREIGN PATENT DOCUMENTS

84/03942 10/1984 World Int. Prop. O. ........... 342/124

OTHER PUBLICATIONS

Stuchly et al, "Microwave Surface Level Monitor"; *IEEE Trans. on Industrial Electronics and Control Instrumentation;* (vol. IECI-18, No. 3; 8/71; pp. 85–92).
Young, "An Automated Multiple-Frequency Radar System"; 1974 *Intl. IEEE/AP-S Symposium Digest 'Antennas and Propagation',* (6/74; pp. 347–349).
Edvardsson, "An FMCW Radar for Accurate Level Measurements"; *Proceedings of the Nineth European MW Conf.;* (9/79; pp. 712–716).

*Primary Examiner*—Theodore M. Blum
*Assistant Examiner*—Bernarr Earl Gregory
*Attorney, Agent, or Firm*—Francis J. Lidd

[57] ABSTRACT

A sweep frequency, continuous wave (CW) radar tank gauge (3) providing measurement of the level of tank contents or ullage (19), having greatly improved accuracy through improved methods of processing calibrate and return signals directed toward the surface of tank contents (20). Use of sweep synchronous measurement (46) of time domain calibrate/return difference signals (42) and time domain of a virtual "carrier" fundamental in the frequency domain, provide highly accurate measure of tank signal return times. The entire range of return signals is made available for processing and analysis (5), including distinguishable tank bottom reflections.

10 Claims, 5 Drawing Sheets

RADAR TANK GAUGE

This is a continuation of co-pending application Ser. No. 831,369, filed on Feb. 19, 1986.

BACKGROUND OF THE INVENTION

This invention refers generally to tank level or ullage measurement by reflection of RF or radar signals directed at the surface of the tank contents, and more particularly concerns time/frequency domain processing of calibrate and return signals utilizing digital techniques.

Radar reflective techniques are well known to those skilled in tank level measurement arts. Exemplary of systems of this type is disclosed and claimed in U.S. Pat. No. 4,044,355, hereby incorporated by reference. This patent discloses and claims a sweep frequency, continuous wave radar gauge employing complex analog filtering and processing techniques to improve accuracy of level measurements.

Prior art systems of this type are in fairly common use and have provided reasonably satisfactory operation however, systems of this type suffer from substantial difficulties due to highly complicated systems of removing spurious reflected signals encountered when received signals reflected from the tank content surface are processed. Known gauges of this type suffer from highly complex analog signal processing equipment and resultant degradation of accuracy over periods of time and use.

The system disclosed in this application overcomes many of the shortcomings inherent in presently used systems through the use of time/frequency domain transformations and a novel sweep synchronous measurement and storage of a generated transmit/receive difference signal. The inventions includes determination of a novel "virtual carrier" representation of the differences between transmitted and received tank signals.

It is therefore an object of this invention to provide a radar tank level gauge having improved accuracy through the use of synchronized sweep frequency, and measurement of a generated difference signal having a frequency proportional to tank level.

It is an additional object of this invention to provide a radar tank gauge utilizing time/frequency domain processing of a transmit/return difference signal over a predetermined swept frequency range.

It is a further object of this invention to provide a radar tank gauge wherein a virtual modulated carrier representation of the true transmit/return tank signal and calibrate signal difference is generated.

It is yet an additional object of this invention to provide a radar tank gauge wherein the sweep frequency signal includes gain compensation.

It is a further object of this invention to provide a radar tank gauge wherein returned difference signals include the full range of reflected information, including information sufficient to distinguish the tank bottom or distance limit of the predetermined measurement range.

SUMMARY OF THE INVENTION

A signal from a radar antenna positioned internal of a storage tank or other container for fluent material, allowing transmission and reception of radio frequency waves from the antenna to the surface, and then reflected from the surface back to the antenna. The transmitted signal typically having a frequency of 10 gigahertz (GHZ) sweeps or is varied over a frequency range of 1 GHZ in a linear or semi-sawtooth fashion. In keeping with conventional radar gauging techniques, an identical swept radio frequency signal is also transmitted through a calibrating line of known length.

Signals reflected from the surface of the fluent material delayed due to travel to and from the antenna are mixed through conventional techniques to provide a difference signal having a frequency representative of the distance traveled. Similarly processed calibration line and reflected signals are utilized to determine an accurate distance from antenna to fluent material surface.

A central processing unit triggers or initiates the sweep frequency and sampling period so as to be in synchronization although asynchronous with the difference signal. Measurement and storage intervals or "bins" are part of the novel signal processing aspect of the invention disclosed herein. The significance of the "bin" will become apparent from further description.

The central processing unit remote from the RF and sweep control portion establishes the above mentioned sweep periods and bin parameters through the use of a sweep control clock. Also contained in the central processing unit is means for converting received signals from time to frequency domain for further processing. Display signals are also performed by the central processing unit so that a continuous reading of tank content level or ullage is displayed.

The difference signal received from the mixer typically in the audio range of 0.25 to 9.6 kilohertz, is supplied or transmitted to the frequency analysis portion of the central processing unit. The received difference signal is sampled and stored.

These time domain difference signals are processed by the central processing unit utilizing a fast Fourier transform (FFT), thereby establishing a frequency domain representation of sinusoidal components contained in the difference signal. The frequency domain representation establishes the above mentioned bins, each bin containing a predetermined number of difference signal cycles.

Those skilled in the art will readily recognize that use of a synchronous sampling yields, after transformation by fast Fourier transfer (FFT) of the sampled return difference signal, a frequency domain signal essentially in the form of SINx/x. In keeping with the invention disclosed, synchronization of the sweep frequency and storage bin sampled periods results in a frequency domain representation of the signal's power spectral density, wherein frequencies are arrayed over the difference frequency range, with distinguishable amplitudes.

Further processing continues with selection of the principle frequency component of the transformed difference signal, analyzed from each bin content, resulting in a single or "carrier" frequency, having a period closely representative of twice the distance from the transmitting antenna to the tank material level. It should be noted that applicants have discovered that in essence, the received difference signal is essentially a modulated carrier wherein the carrier represents the true directly reflected signal and modulating components due to spurious reflection and other radio frequency interference, constitute "modulation" of the carrier. Therefore, in processing distinctly opposite to conventional detection, wherein the carrier is removed and sidebands generated by the modulation are retained, applicant's invention utilizes a novel technique to in essence, remove the modulation, thereby making the carrier available for distance measurement.

In keeping with the further aspects of applicants' invention, the power spectral density of the carrier signal as determined, is utilized to determine a centroid of the carrier signal. A similar centroid of the calibration signal is also determined. It will be readily understood by those skilled in the art that the quotient of the carrier centroid over the calibration centroid contains the information which allows correction based on the delay line length, thus providing a true measurement of the distance between tank antenna and tank content surface. Further corrections to the true length due to physical locations of radio frequency components are also provided by central processing unit operation.

BRIEF DESCRIPTION OF THE DRAWINGS

Other objects and advantages of the invention will become apparent on reading the following detailed description and upon reference to the drawings, in which:

FIG. 4a shows four cycles of a typical swept frequency signal as transmitted by the tank gauge antenna. Also shown is a representation of a reflected signal.

FIG. 4b is a graphic representation of the sampled window or "bin" as used in the invention.

FIG. 4c is a graphic representation of the reflected and mixed difference signal stored in the bins of 4b.

FIG. 4d is a conceptual representation of "typical" signals obtained from mixing the transmitted and reflected signals of 4a.

FIG. 4e is a graphic representation of the time based reflected difference signal, stored in the bins of FIGS. 4b and 4c, now transformed to the frequency domain.

While the invention will be described in connection with a preferred method and typical embodiment, it will be understood that the radar gauge disclosed does not limit the invention to the methods and embodiments disclosed. On the contrary, applicants intend to cover all alternatives, modifications, and equivalents as may be included within the spirit and scope of the radar gauge as defined by the appended claims.

DETAILED DESCRIPTION OF THE INVENTION

Figure 1:
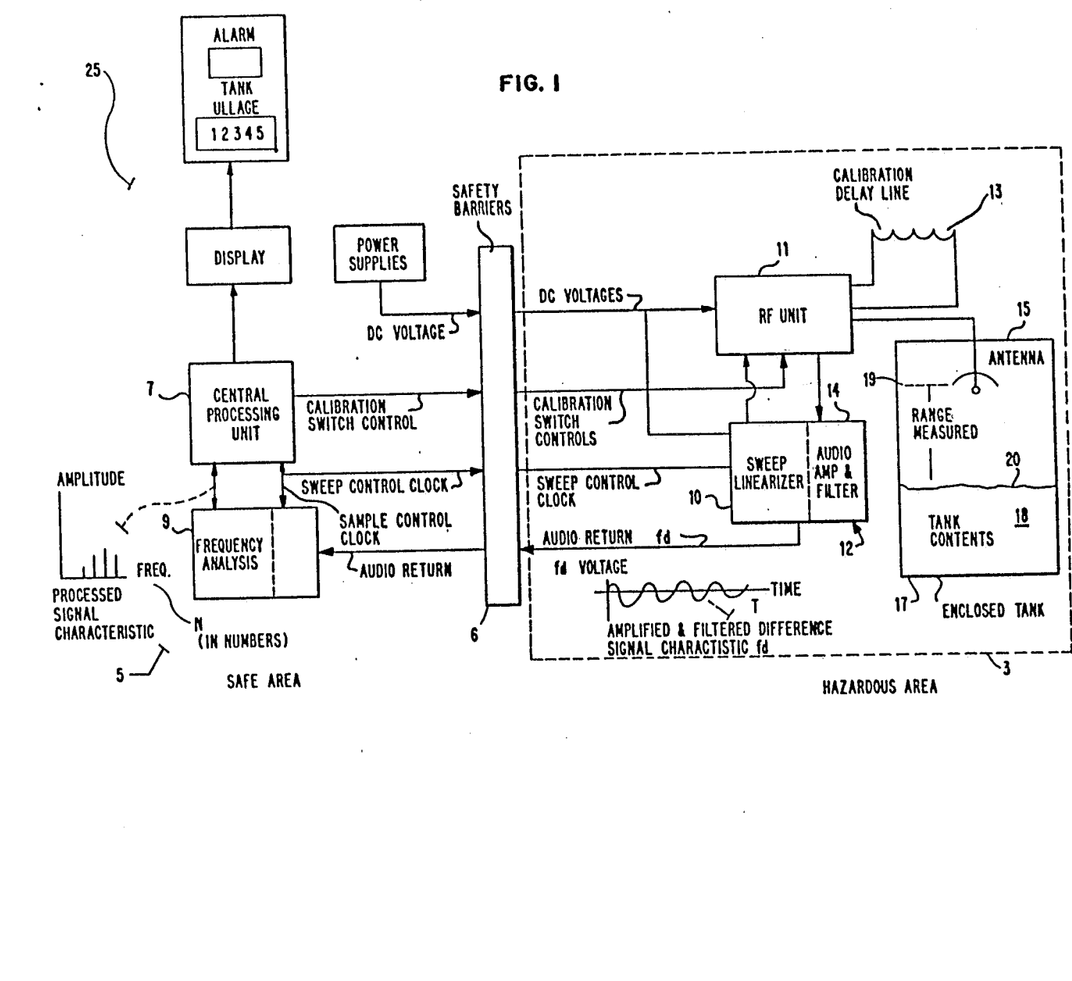
FIG. 1 is a semi-schematic depiction of the radar tank gauge system.

Turning first to FIG. 1, there is shown the radar gauge and signal processing system 1 incorporating an antenna 15 mounted internal of a tank or other containing structure 17, having contents 18 contained by the tank to a level such that the difference between the tank content surface 20 and height of the antenna 15 results in a distance or measure range 19. The RF and tank assembly 3 is separated from the signal processing assembly 5 by safety barriers 6. The function of the safety barrier is to allow use of the RF assembly 3 in hazardous areas by limiting electrical power available to a value which does not provide the opportunity for ignition of the volatile tank contents.

The RF and tank assembly 3 further utilizes an RF unit 11 (reference FIG. 2), supplying continuous wave radio frequency power, typically in the 9.5 to 10.5 gigahertz range. Also in the RF and tank assembly is a control and signal processing unit 12 for establishing time sequence of transmitted antenna signals, calibration signals, and preliminary operation on tank difference signals. The control and signal processing unit 12 performs the operations necessary to process the complete range of return signals. Included in this range is the predetermined maximum distance as represented by reflection of the tank bottom. Bottom reflections are recognized and distinguished for large ullage measurements, i.e. levels of fluent materials in the tank. This provides positive identification of a known distance, resulting in improved range measurement.

The safety barrier 6 also acts as an interface between the RF and tank assembly, and the above mentioned signal processing and display assembly 5. The signal processing assembly further comprises a central processing unit 7 having a frequency analysis function for performing discrete Fourier transforms of difference signals. Also contained in the signal processing and display assembly is a display 25 comprising a cathode ray tube, and d'Arsonval meters providing continuous indication of the measured tank range 19 and other quantities in signal processing as may be required. Simultaneous digital display of tank ullage, time and frequency domain representations of the reflected signals, and other specialized displays essential for operation of a specific gauge application are readily provided. Those skilled in the tank level gauging arts will readily see that many forms and variations of tank display can be used with the signals provided by the invention disclosed herein.

Figure 2:
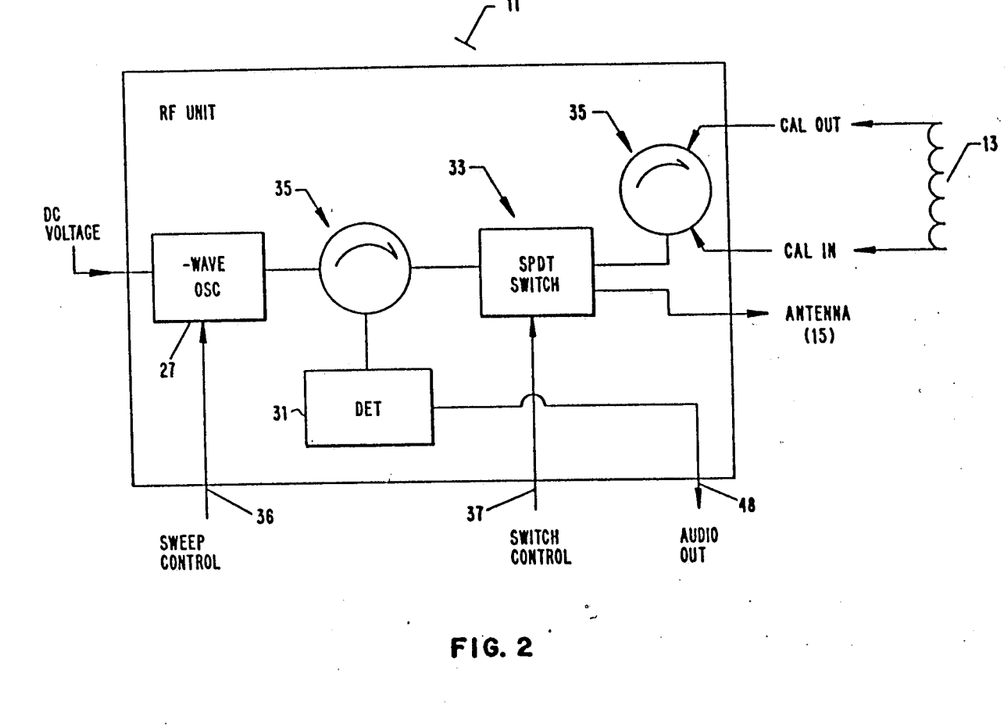
FIG. 2 is a detailed semi-schematic depiction of the RF unit of FIG. 1, particularly showing the functions of RF generation, signal coupling, RF transmitted signal control, and difference signal detection.

Transmission of the radio frequency signal generated by microwave oscillator 27 is routed between the RF switch 33, and detector 31, by microwave circulator 35. An additional circulator is utilized to route calibration signals from the control switch 33 through the calibration delay line 13 in order to generate a reference signal. The significance of this signal will be described in more detail.

As indicated above, the return or received signal 42 differing in time phase from the transmitted signal 40 by a time/frequency difference 41 (reference FIG. 4a) turns from the antenna 15 through the RF switch control 33 and circulator 35 to the detector or mixer 31.

Figure 4:
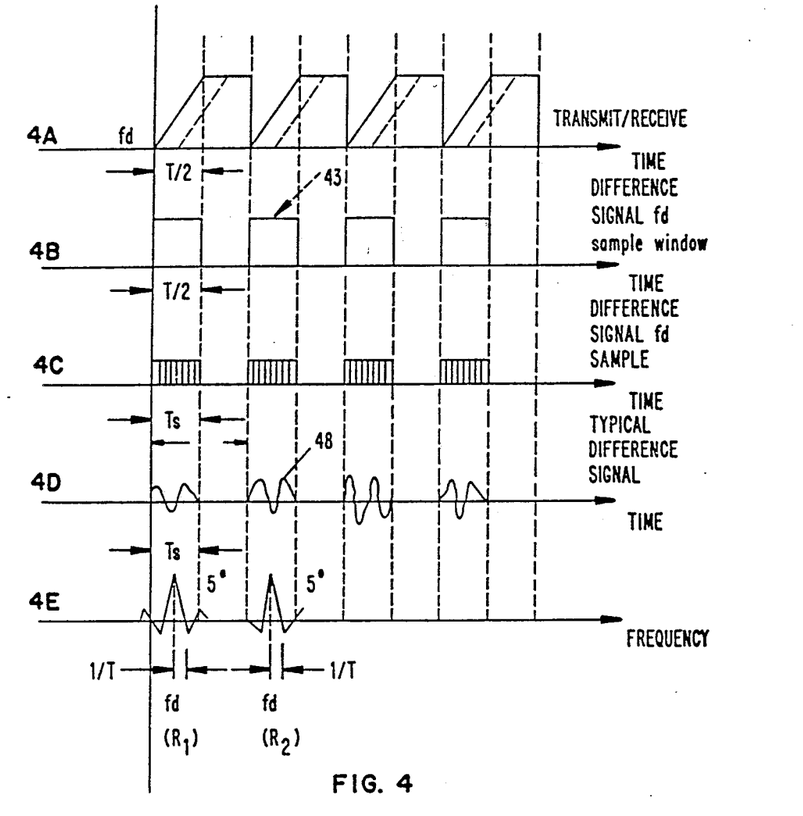
FIG. 4 is a graphical representation of the signal processing and conversion of the disclosed invention, particularly showing the relationship in time and frequency domain of transmitted, reflected, and difference signals.

With further reference to FIG. 4, an RF signal 40 having a swept frequency as shown between 9.5 and 10.5 gigahertz is transmitted by an antenna 15 arranged to direct a concentrated signal to the surface 20 of tank contents 18. In keeping with conventional radar gauging techniques, the signal 40 returns to the RF unit via the antenna 15 as the signal 42 delayed by an amount 41 in both frequency and time relative to the transmitted signal 40 due to travel to and from the fluent material surface. As shown, the received signal 42 is mixed with the originally transmitted signal 4 in the detector 31, generating a difference signal 48 (ref. FIG. 4e). Difference signals are stored in sample windows 43, having a period 44 identical to and synchronized with that of the frequency sweep portion of the transmitted signal 40.

Operation of the circulator 35 will be well known to those skilled in the microwave arts and therefore not discussed in further detail. In operation, portions of the transmitted signal are also directly sent to the detector. Detector inputs now consist of the initially transmitted signal and the received signal delayed in time as indicated above. The mixing or detecting operation, also well known to those skilled in the radio frequency arts, provides an output frequency equal to the difference of the transmitted and returned signals. In the case of the invention disclosed herein, the mixed or difference signal 48 is in the audio frequency range characteristically 0.250 to 9.6 kilohertz for reflected signals traveling the distance 19 of 1 to 40 meters. A graphic representation of these return signals 48 are shown in FIG. 4d.

In keeping with the novel and inventive aspects of the applicants' invention, applicants have discovered that samples of the difference signal 48, taken in synchronization with the period of the transmitted sweep signal 41, are stored for periods identical, i.e. having the same initial and terminal times, to that of the sweep portion of the transmitted signal. This synchronous processing of difference signals, when transformed into the frequency domain, eliminates the phenomena known as frequency leakage. Non-synchronous sampling would result in introduction of additional frequency components, introducing frequency leakage errors into the signal representative of the tank ullage 19, in the mixed signal 48.

Applicants have further discovered that application of on-line direct Fourier transforms of the stored difference signals during the intervals Ts', indicated as 46 on FIG. 4c, provides a frequency domain representation 50 (reference FIG. 4e) of the measured and stored time domain return frequency 48, containing essentially all of the frequency components necessary to accurately determine the tank ullage 19 contained in the returned signal 42.

Figure 5:
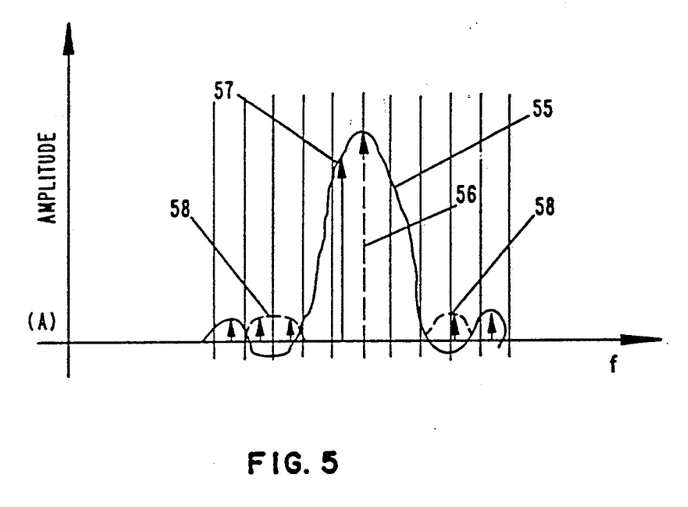
FIG. 5 shows in graphic display the amplitude/frequency relationship of the difference signal, particularly showing determination of the centroid or "carrier" frequency of the reflected difference signal.

Further signal processing in the frequency domain in keeping with applicants' inventive discovery, proceeds with determination of a centroid of the synchronous frequency distribution of the return signal 48. With particular reference to FIG. 5, the now transformed signal 55 of the returned mixed signal 48 is shown in a SINx/x form. As those skilled in the art of transform mathematics will readily see, the SINx/x representation 55 shows as vertical components along the frequency axis here typified as 57 and 58, frequency components of the returned and mixed signal 48. As transformed, the components of the returned signal include extraneous frequency components returned to the antenna 15 through oblique reflection, noise, and non-direct radio frequency signals from other unknown sources. As these are not of interest in measuring the tank ullage, applicants have discovered that the frequency domain representation establishes a dominant frequency shown in FIG. 5 as component 56. An additional and substantial error is also introduced due to the relative non-linearity of the frequency sweep over its range of 9.5 to 10.5 gigahertz. In keeping with the invention disclosed, applicants have utilized techniques for linearizing sweep frequency voltages as are typically available from state-of-the-art equipment. Linearization is accomplished through generating a compensating control voltage wave form utilizing digital information stored in the central processor. Under control of the central processor, linearizing signals are applied to the voltage controlled oscillator portion of the variable frequency oscillator 27.

Novel aspects of the discovery disclosed herein can best be described through the following exemplary and nonlimiting example. For the case typically disclosed where the tank ullage range or distance of 40 meters is desired, the following well known relationship between return signal difference frequency, and other system parameters is representative;

$$f_d \text{(the return difference frequency)} = 4BR/Tc$$

where;

B = the return signal frequency band width, i.e. the sweep frequency range of the oscillator 27 under sweep control 36 from the sweep linearizer 10.

R = 40 meters, the desired measurement range.

T = 0.025 seconds corresponding to the sweep frequency period of oscillator 27 at 19 sweeps per second.

It should be noted that the sweep frequency is essentially an arbitrary quantity chosen to provide adequate measurement taking into account the maximum rate of change of the ullage 19.

$c = 3 \times 10^8$ meters/seconds, the speed of light and the transmitted signal.

If the above relationship is rearranged to determine the range R;

$$R = Tcf_d/4B$$

Substituting the above constant provides the following;

$$R = f_d/250$$

Since the difference frequency $f_d$ is measured to the accuracy of the quantity $\delta f$, then the corresponding accuracy of the range measurement $\delta R$ is;

$$\delta R = \delta f_d/250$$

Since, in the system disclosed, the sweep or sample frequency is approximately 18.75 hertz, the observational period is approximated by;

$$t_s = \frac{1}{f_s} \quad \frac{1}{18.75 \text{ hz}} = 53.3 \times 10^{-3} \text{ seconds.}$$

In the frequency domain then, the return difference frequency represents a measured range increment $\delta R$ equal to $1/250 \times 53.3 \times 10^{-3} = 0.075$ meters.

The above figure, i.e. 0.075 meters represents the basic distance which can be resolved through conventional conversion of the returned time domain signal $f_d$ in the frequency domain. Also, return signal errors in the above measurement are introduced by conventional instrumentation and measurement inaccuracies.

Most importantly, errors due to corruption of the return signal spectrum in the frequency domain as would be transformed by prior art approaches, by inclusion of energy in the form of extraneous signals due to noise, uncontrollable, spurious reflections from inside the measuring tank or container, and other random energy measured as signals, are incorporated in the return signal $f_d$. Prior art analog filtering methods suffer from inclusion of this error due to the non-linear characteristic of their filtering components. These errors are well known in the art as "frequency leakage".

In keeping with the invention disclosed herein, it has been discovered that frequency leakage can be substantially eliminated by synchronous measurement of predetermined time quantities of the return signal, as indicated earlier and shown in FIG. 4.

If synchronously measured and properly stored samples of the return difference signal are transformed or converted into the frequency domain utilizing a discreet fast Fourier transform, the frequency spectrum of the return signal $f_d$ is essentially preserved, allowing, in further keeping with the invention disclosed, determination of the centroid of the return signal spectrum, as a discreet frequency representing a measurement of the tank ullage having substantially increased accuracy.

In keeping with the invention disclosed, synchronous sampling of the returned frequency $f_d$ for an ullage or range value of 40 meters and a sweep sample rate of approximately 19 hertz, and a maximum return difference frequency $f_d$ of approximately $19 \times 10^3$ hz/second, a discreet number of sampling periods or bins synchronized in the above system is determined.

In order to avoid the frequency leakage inaccuracy, sampling periods for transformation by fast Fourier transform (FFT) as indicated above, the invention disclosed herein contemplates use of an integral number of bins or storage periods corresponding and synchronized to the oscillator frequency sweep. The number of storage bins also incorporates maximum storage sample frequency at least two times the maximum returned difference $f_d$. Therefore, the number of bins or groups for storing values of the return frequency $f_d$ is;

Bins or synchronous sampling periods =

$$\frac{2 \times f_d \text{(the maximum return frequency)}}{f_s \text{(sweep frequency)}} =$$

$$\frac{2 \times 9.6 \times 10^3 \text{ hz}}{18.75 \text{ hz}} \approx 1025 \text{ bins or sample periods}$$

However, as the sampled period is one half the sweep period, 512 bins or samples can be used.

If 1025 or an integral number of sample periods or bins are measured and stored, in keeping with the invention disclosed, a fast Fourier transform of the return signal derived from the above bins will essentially eliminate frequency leakage. Therefore, the transformed difference signal $f_d$ in the frequency domain will demonstrate a spectrum of vertical lines, 55, 56, 57, and 58 (reference FIG. 5) providing a means for determining the most likely or carrier frequency in the measured samples of difference frequencies, i.e. frequency 5-6 of FIG. 5.

As will be discussed below, this technique in combination with conventional methods of determining centroids of the transformed frequency spectrum 55 provides a convenient method for improving the accuracy of the transform through introduction of zeros to prestored bins representing previously recorded values of return difference frequencies.

A zero introduction technique, a further aspect of the invention disclosed, allows the FFT to essentially generate a frequency spectrum over a sample period effectively made larger by the number of zeros added, resulting in increased accuracy in final determination of a frequency centroid.

Conventional digital signal processing using power spectral density analysis provide a means for determining the peak frequency 56 having a maximum amplitude and rejecting others, thereby increasing substantially the accuracy of tank ullage measurements. Frequency component 56 in essence, can be considered a "carrier" frequency having a time phase difference from the transmitted signal 41. The centroid location along the frequency axis, of a "typical" mixed return signal, is in fact a highly accurate representation of the time required for the radio frequency signal to traverse twice the distance between the antenna 15, and surface of the tank contents 20.

Applicants discovery therefore, provides a highly accurate mathematically rigorous method for isolating a single signal from the received signal after mixing, which provides a convenient method for rejection of spurious components. This approach attains accuracies in the order of $+/-1.0$ millimeter in distance measurements or tank ullage 19 of forty meters.

Computations including transformation of stored portions of the return signal 46 (reference FIG. 4c) into the frequency domain, and determination of the component or carrier 56 of the transformed difference signal 55 are performed continuously and on-line in the frequency analysis portion 9 of the central processing unit 7.

In operation, transmitted signal 8 from antenna 15 positioned closely adjacent to the tank surface at a range 19 from the surface 20, varies in frequency from 9.5 to 10.5 gigahertz at a sweep frequency of 18.75 hertz, giving a swept frequency period of 53.3 milliseconds as indicated above. Reflected signals 42 under control of the sweep control clock of the central processing unit 7 and TR switch 33, return via antenna 15 and circulator 35 to the detector/mixer 31.

Figure 3:
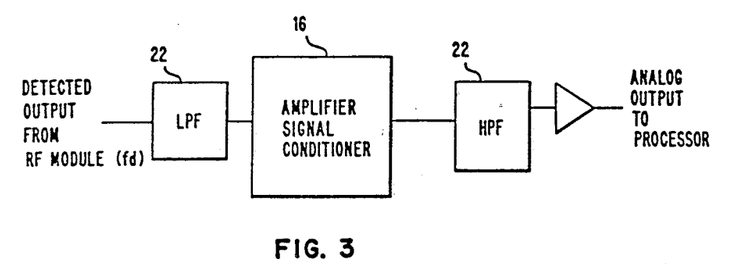
FIG. 3 is a functional block diagram of the audio amplifier and signal conditioner.
Figure 3A:
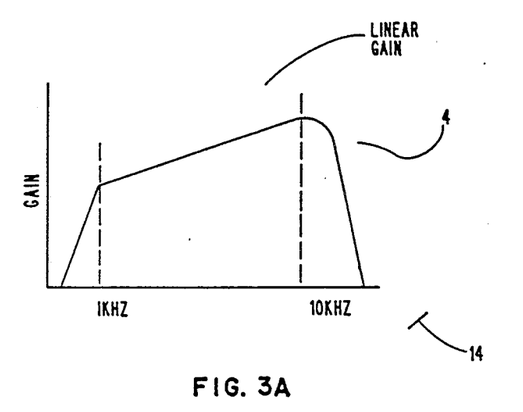
FIG. 3a is a graphic representation of the gain characteristic of the signal conditioner of FIG. 3.

Mixer or detector 31 generates a difference signal 48 which is returned to the frequency analysis portion 9 of the central processing unit 7 via the sweep linearizer 10. As the linearity of the frequency sweep, i.e. the linearity of the leading edge 41 of the transmitted signal, substantially affects the accuracy of ullage measurement, applicants' method utilizes the most linear portion of the sweep signal 4 (reference FIG. 3a). Applicants have discovered that adjustment of the utilized portion of sweep signal 4 is best accomplished in each assembled system. As the sweep signal is readily available in the display means of the processor 25, provision for adjusting the overall system so as to use the most linear portion of the sweep signal 4, are provided.

The CPU 7 generates a sampling pulse 46 in synchronization with transmitted signal 40. Typically, as indicated above, during the sampling period 44, 512 samples are stored at a frequency of 18.75 hertz.

Depending on the particular range or value of ullage 19, a difference signal 40 having a frequency of 0.250 to 9.6 kilohertz is generated during the swept portion 43 of transmitted signal 40. For a sampled period T, under control of the CPU 7, the sampled window is T/2 again in a synchronous relationship with the transmitted signal 43.

This method of sampling the mixer generated difference signal, when transformed into the frequency spectrum, provides discreet frequencies evenly spaced at 1/T, i.e. where T is the period of the transmitted swept signal, present in the frequency spectrum. Typically, frequency bin width is 18.75 hertz, corresponding to a sampling period of $53.3 \times 10^{-3}$ seconds. Under these conditions, this represents 75 millimeters of ullage as shown above.

Returned and mixed signals from each storage bin after transformation from time to frequency domain are arrayed in a frequency domain representation roughly shown in FIG. 5. The representation in FIG. 5, while of the SINx/x configuration, is only typical, i.e. other amplitude/frequency distributions of the transformed signal can and may be obtained. The vertical frequency "spikes" 56, 57, and 58, represent discrete frequencies as transformed. Due to the synchronization of the sweep and sampling periods as shown in FIG. 4, these discrete frequencies are spaced at 1/Ts, that is, at a frequency spacing equal to the sample frequency. With particular reference to FIGS. 4d and 4e, the results of synchronous sampling of the difference signal 46 is shown. In particular, FIG. 4e represents the discrete frequency representation 50 of the time varying difference signal 48. It should be noted that synchronizing the period of the sweep frequency 41 with the sample period Ts' of FIG. 4c results in a frequency representation of the returned difference signal, having an identifiable dominant frequency represented by the peak of signal 50. Further to FIG. 4e, the band width of the dominant frequencies is equal to $2 \times 1/T$, where T is the period of the swept frequency signal 40.

Determination of the centroid of frequencies represented by the predetermined number of sample periods or bins, in this case 512, proceeds with transformation of the group of sampled signals in each bin from time to frequency domain with the consequent identification of a dominant frequency. The frequencies so determined are then scanned for maximum amplitude. In keeping with applicants' discovery, the frequency array in the vicinity of the maximum amplitude of the entire dominant frequency array is further refined to determine a unique frequency at the centroid of the power spectral density spectrum. This computation proceeds using centroid determining techniques well known to those skilled in the art, involving multiplying the amplitude of each frequency spike by its frequency from a predetermined zero or data reference point. The total sum of these products is then divided by the sum of all frequencies for each indivdiual spike, thus determining the center or centroid frequency most representative of the true reflected signal from which an accurate value of ullage can be determined.

In keeping with the inventive concepts as disclosed, use of the power spectral density contained in the synchronously sampled signal when transformed into the frequency domain, and application of power spectral density techniques can reduce the resolution of any particular measurement along the time axis (reference to FIGS. 4c, and 5) to plus or minus 1.0 millimeter at a maximum range of 40 meters.

With continuing reference to FIG. 4, measured distances represent return signals along a time axis returning later than, or lagging the swept transmitted signal 40, in time and frequency. In this case, the signal 42 represents the signal containing information by virtue of its time lag, essentially twice the distance between the transmitting antenna and surface of the contents of the tank 17.

Further, at each sampled window 43 having a sample period 44, information relative to the power spectral density distribution of the return signal 42 is made available in stored form. As discussed above, power spectral density (PSD) techniques provide a means for greatly increasing the accuracy of measurement through determination of a virtual carrier or fundamental frequency representative of the true time of transmission over a distance two times that between the transmitting antenna and the surface of the tank contents.

In order to utilize the carrier frequency domain information in a final determination of tank ullage, applicants have discovered that calculation of the centroid of the now transformed frequency domain difference signal incorporates the entire power spectral density of the transformed difference signal. This approach constitutes a major discovery in that, as indicated in FIG. 5, a unique or clearly identifiable carrier frequency depicted as 56, may not appear in the transformed difference signal. However, the use of power spectral density techniques (reference FIG. 5) in determining the relative magnitude and frequency of measured components present in the transformed difference signal, determines a "virtual" carrier incorporating or estimating the transformed components of the reflected wave utilizing a mathematically rigorous technique. The carrier frequency so determined provides a basis for measurement of tank ullage having greatly increased accuracy.

The further improvement in determining an accurate virtual carrier frequency from synchronously stored data can be accomplished through adding zeros to the individual bins in multiples of the initially collected group. In this case, as the initial storage proceeded on the basis of 512 storage intervals, adding an additional 512 zeros to each bin as located in the CPU, and proceeding with the transform, effectively provides transformed information based on 1,024 samples, resulting in substantially improved resolution of returned difference signals in the frequency domain. It should be noted that no new information is required and that due to the intermediate storage technique wherein bin data is available for processing, distance measurement can proceed with the initial 512 samples, followed by a further determination based on 1,024 samples. Those skilled in the art will readily recognize the possibility for adding additional zeros and proceeding with a transform operation on the basis of integral multiples of 512, i.e. 1,024, 2,048, and so on.

Determination of the refined carrier frequency would then proceed as indicated above, wherein the maximum amplitude and centroid would be calculated for use in the range for tank ullage formula discussed below.

Exact determination of the tank ullage or distance 19 proceeds with the determination of a similar difference signal in a time sequential calibrate operation. The calibrate difference signal is determined through the use of periodic sweep radio frequency output passing through the transmit/receive (TR) switch 33, and entering the circulator 35 has an output to calibrated delay line 13 and an input from the calibrated delay line 13. In a manner similar to that described above for the transmitted antenna signal, a calibrate difference signal representative of time delay of a transmitted RF signal through the known length of calibration delay line 13 is similarly processed.

The now transformed and determined "virtual" carrier frequency of the returned delay line signal is used to determine a calibrate centroid of the returned delay line difference signal.

A corrected value of the range or ullage indicated earlier is therefore;

$$R = \frac{\frac{Na}{Nc} \times L_{cal}}{2}$$

Where:

R = the corrected value of measured range 19, $n_a$ = the centroid of the difference signal $f_d$ determined according to the disclosed invention in arbitrary units;

$n_c$ = the centroid of a returned calibrate distance determined according to the disclosed invention in arbitrary units;

$L_c$ = the known length of the calibrate delay line 13;

$R_o$ = an effective length correction for constant and determinable inaccuracies introduced by the radio frequency structure.

Tank ullage 19 can now be determined as being equal to one-half of the distance represented by time of signal travel from one end of the calibrate delay line, multiplied by a quotient, having a numerator equal to the centroid of the received antenna difference signal, and a denominator equal to the centroid of the calibrate difference signal. Determination of these signals and centroids was discussed above. A further correction for signal time delays inherent in the processing and measurement systems such as distance between the mixer, TR switch, and antenna are also incorporated. Typically, an average of two measurements, i.e. two determinations of the antenna difference signal incorporating a time to frequency transformation determined by 512 samples, and a similar measurement of the delay line difference frequency.

Thus, it is apparent that there has been provided in accordance with the disclosed invention a radar tank gauge that fully satisfies the objects, aims, and advantages set forth above. While the particular gauge as disclosed and its attendant signal processing technique has been described in conjunction with a specific embodiment, it is evident that many alternatives, modifications, and variations will be apparent to those skilled in the art in light of the foregoing description. Accordingly, applicants intend to embrace all such alternatives, modifications, and variations as fall within the spirit and broad scope of the appended claims.

Therefore, we claim:

1. In a radar tank gauge having a focused antenna mounted in close proximity to the surface of the tank contents, for generating a continuous wave swept frequency radio frequency signal transmitted to said surface, including simultaneous measurement of a signal reflected from said surface, and generating a difference signal representative of the distance between the antenna and tank level, the improvement comprising:

means generating an antenna radiated signal of predetermined frequency and duration;

means receiving a reflected signal from said surface;

means deriving a signal representative of the difference between said transmitted and reflected signal said difference signal including the entire frequency range of said reflected signal;

means measuring frequency and amplitude of said difference signal said measurement in time phase synchronization with said transmitted signal;

means storing groups of said measured difference signals, said groups having a predetermined time duration and representative of the entire frequency range of said measured difference signal;

means transforming said difference signal groups from the time to frequency domain, thereby generating a power spectral density representation of each said synchronously measured difference signal group;

means determining the frequency centroid of said transformed signal whereby a carrier frequency closely representative of the true difference frequency is identified.

2. The improvement of claim 1 wherein said transformation utilizes at least 512 synchronized samples of at least 53.3 milliseconds duration.

3. The improvement of claim 2 wherein said synchronized transmitted signal and measurement groups have integrally related periods.

4. The improvement of claim 1 wherein said antenna signal has a first swept frequency portion and a second constant frequency portion.

5. In combination, a radar tank gauge having a swept frequency signal transmitted to and reflected from the surface of the tank contents for generating a difference signal indicative of height of said tank content, and a difference signal processor comprising:

means generating a transmitted radio frequency signal of predetermined period;

means measuring continuous groups of said difference signal said measured groups representative of the entire frequency range of said measured difference signal, said groups having predetermined time periods;

means synchronizing the periods of said transmitted and difference signal measured groups thereby generating synchronized samples of said difference signals;

means storing said measured sample groups;

means transforming said stored difference sample groups from time to frequency domain;

means analyzing the power spectral density of said transformed difference signal sample group for determining a fundamental or carrier frequency representative of the travel distance of said reflected wave.

6. The difference signal processor of claim 5 wherein said measuring means comprises at least 512 groups of 53.3 milliseconds time duration.

7. The signal processor of claim 6 wherein said transmitted signal further comprises;

a swept frequency portion having a period integrally related with said measuring time;

a second constant frequency period;

wherein termination of any one of said measured group and initiation of said second transmitted signal period coincide.

8. The radio frequency generating means of claim 5 further comprising;

means generating a time increasing voltage;

a voltage controlled oscillator responsive to said voltage for transmitting a varying frequency signal;

means distinguishing linear and nonlinear portions of said linearly increasing voltage;

means limiting response of said voltage controlled oscillator to said linear portion of said voltage;

wherein said varying oscillator frequency is restricted to the most linear portion of said generated voltage.

9. A method of processing continuous sequential difference signals generated by and synchronous with the transmitted signal of a swept frequency radar tank gauge comprising the steps of:

measuring frequency and amplitude of predetermined groups of said continuous difference signals, said groups having equal predetermined periods representing the entire frequency range of said difference signal;

storing said measured groups;

transforming said measured difference signals from time domain to frequency domain;

analyzing the power spectral density of said transformed difference signal;

determining a fundamental or carrier frequency from said power spectral density analysis, said carrier representative of the frequency of said difference signal.

10. The method of processing of claim 9 wherein the step of generating a transmitted signal having swept and constant frequency portion, further includes the steps of;

generating a time increasing voltage having linear and nonlinear portions;

generating a transmitted signal of varying frequency in response to the linear portions of said varying voltage.

* * * * *